US005354592A

United States Patent [19]

Miskell

[11] Patent Number: 5,354,592

[45] Date of Patent: Oct. 11, 1994

[54] SOLID SURFACING EDGE TREATMENT METHOD AND ARTICLE

[76] Inventor: Thomas Miskell, 130 Bloom Dr., Dixon, Calif. 95620

[21] Appl. No.: 4,504

[22] Filed: Jan. 14, 1993

[51] Int. Cl.[5] .......................... B32B 3/02; B27F 1/00; B27M 1/08; B29C 65/00

[52] U.S. Cl. ...................................... 428/115; 29/412; 29/557; 144/134 R; 144/347; 144/354; 144/355; 144/365; 156/304.5; 428/45; 428/60

[58] Field of Search .............. 26/412, 450, 458, 527.2, 26/557, 558; 144/3 R, 35 R, 134 R, 137, 346, 347, 354, 355, 365, 367; 156/304.5; 428/45, 60, 81, 106, 115

[56] References Cited

U.S. PATENT DOCUMENTS 5,002,107 3/1991 Rasmussen .......................... 144/367

*Primary Examiner*—W. Donald Bray
*Attorney, Agent, or Firm*—Bernhard Kreten

[57] ABSTRACT

An edge treatment for solid surfacing is provided which is attachable to a cantilevered margin (60) of the solid surfacing (50). The edge treatment may have a curved contour on a top (12) for finishing the cantilevered margin (60) of the solid surfacing (50). Angles in the cantilevered margin (60) are covered with corner edge treatments (10) having an inner cylindrical surface (16) and an outer cylindrical surface (18). A groove (20) is carved into the corner edge treatment (10) on a side thereof adjacent the cantilevered margin (60). The cantilevered margin (60) is provided with a tongue (62) having a complemental cross-section to that of the groove (20). The corner edge treatment (10) connects to the tongue (62) of the cantilevered margin (60) with adhesive interposed therebetween to form a secure and easily assembled edge for the solid surfacing (50). The corner edge treatments (10) are formed from blank stock (1) by first boring a hole through the stock (1) and then carving the outer cylindrical surface (18) which parallels the inner cylindrical surface (16) defined by the bored hole. The resulting torus (5) can then be provided with the groove (20) on either the inner cylindrical surface (16) or the outer cylindrical surface (18) and a top (12) thereof can be provided with a desired contour. The torus (5) can then be cut into various segments having an angle which corresponds to an angle of the cantilevered margin (60) of the solid surfacing (50).

22 Claims, 4 Drawing Sheets

SOLID SURFACING EDGE TREATMENT METHOD AND ARTICLE

FIELD OF THE INVENTION

The following invention is related to an article of manufacture and methods of making edge treatments for solid surfacing which can be used on countertops and other structures. Specifically, this invention relates to an article and a method of making edge treatments, especially corner pieces for cantilevered edges of solid surfacing.

BACKGROUND OF THE INVENTION

Countertops and other flat horizontal surfaces are commonly covered with a variety of different materials. While wood is a very commonly used material and stone is also used in many instances, it has become common for horizontal surfaces to be covered with tile or laminates such as Formica®. Hard colorized resins generally referred to as solid surfacing have only very recently been in vogue. One such type of solid surfacing is sold under the trademark Corian TM and is characterized as having a very smooth and very hard surface which is completely non-porous that wears well. This surface is ideal for environments where liquids are often spilled onto the surface and easy clean up is desirable, such as kitchen and bathroom countertops and shower and bathtub areas within the home environment. The solid surfacing is also desirable because it can be joined directly to adjacent pieces of solid surfacing with a joint adhesive therebetween and then may be sanded down such that the joint is hardly perceptible.

While this solid surfacing has many desirable attributes, edge treatments have been a continuing problem. When finishing edges of solid surfacing, heretofore it has been necessary to extensively sand edges of the solid surfacing to provide smooth transitions between the horizontal surface and its vertical edge.

These problems are exacerbated when attempting to provide solid surfacing which follows curving contours along an edge of the solid surfacing. When this type of edge treatment is desired, it has been necessary to adhere edge pieces of solid surfacing against a cantilevered edge of the counter and then to sand down the edge pieces of solid surfacing until it attains a desired contour. This process is difficult, time consuming and it is nearly in, possible to obtain a finished edge which is free from minor dips and other imperfections resulting from the sanding process. Accordingly, there is a need to provide a convenient method for providing a decorative edge for solid surfacing.

Where "dripless" edges are desired (i.e. edges which are "berm-like" to prevent liquid from running off the counter) contouring edge molding around a curve has never been standardized and requires custom crafting.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
|---|---|---|
| Young | 1,709,385 | April 16,1929 |
| Romine | 2,610,661 | September 16, 1952 |
| Hewat | 2,642,905 | June 23, 1953 |
| Rasmussen | 5,002,107 | March 26, 1991 |
| Rasmussen | 5,058,640 | October 22, 1991 |

The patents to Rasmussen teach the use of a method and apparatus for forming radius corners on bulk stock. The invention of this application is distinguishable from Rasmussen, inter alia, in that a groove is provided on the trim pieces for connection to the cantilevered margin of the solid surface and multiple trim pieces are created simultaneously in the method of this invention.

The patent to Hewat teaches the use of a work holding clamp for the application of veneer to an edge of a horizontal piece of material. This invention is distinguishable from Hewat, inter alia, in that a groove is provided on an inside surface of the edge treatment which is connectable to the cantilevered margin of the solid surfacing.

The remainder of the prior art listed above, but not specifically distinguished, diverge even more starkly from the present invention than those prior art references specifically referred to above.

SUMMARY OF THE INVENTION

A method of mass producing an edge treatment for solid surfacing is provided which creates easily installable edge treatments connectable adjacent to cantilevered margins of a solid surface such as a countertop. The solid surface countertop includes the cantilevered margin extending outwardly therefrom defining an edge to which a user desires to attach a finished surface. The cantilevered margin includes a tongue extending therefrom. The edge treatments significantly reduce or even eliminate the need to sand the edge treatments after their installation on the tongue of the cantilevered margin of the solid surface counter.

The edge treatments are formed from unfinished stock configured as a rectangular blank with parallel top and bottom surfaces. A cylindrical center hole is then bored through the stock. This creates an inner cylindrical surface perpendicular to the top surface and the bottom surface of the unfinished stock. The blank is then cut along an outer periphery to form an outer cylindrical surface parallel to the inner cylindrical surface but having a greater diameter. This results in unfinished stock forming a torus.

A groove is placed on one cylindrical surface of the torus which has a size similar to the tongue extending from the cantilevered margin. The torus can then be divided into different segments by cutting the torus into separate arcuate segments. Each arcuate segment subtends an angle similar to an angle subtended by a curve within the cantilevered margin of the solid surfacing. In this way, the individual segments can be placed adjacent the cantilevered margin of the solid surfacing at points along the cantilevered margin where curves exist. The groove of the arcuate segment will then be located over the tongue allowing the arcuate segment to securely connect to the cantilevered margin of the solid surface countertop.

Corners within the cantilevered margin of the solid surfacing may be right angles, reflex angles or other angles. If the cantilevered margin angle is a reflex angle (i.e. greater than 180°), the groove is carved in the outer cylindrical surface of the torus. If the angle in the cantilevered margin is not a reflex angle (i.e. less than 180°), the groove is carved in the inner cylindrical surface of the torus. The radius of curvature of the cylindrical surface including the groove is chosen to be identical to either a radius of curvature of a reflex angle of the cantilevered margin or to conform to a radius of curvature of a non-reflex angle in the cantilevered margin. In this way, each arcuate segment is connectable to a portion of the cantilevered margin.

Surfaces of the arcuate segments opposite the groove are finished in a manner conforming to the appearance and function desired for the edge treatment of the solid surfacing. The arcuate segments thus become edge treatments for angled portions of the cantilevered margin of the solid surfacing. The grooving and finishing steps in the manufacturing process of the edge treatments are preferably conducted before dividing the torus into separate arcuate segments but could occur after segmenting the torus. By this invention, the edge treatments are uniformly constructed, economically produced and more efficiently installed.

OBJECTS OF THE INVENTION

It is a primary object of the present invention to provide a method of manufacturing edge treatments for cantilevered margins of solid surface countertops, especially at angles in the cantilevered margins.

Another object of the present invention is to provide an edge treatment which is substantially finished and does not require extensive sanding.

Another further object of the present invention is to provide an edge treatment which includes a groove on a side thereof abutting a cantilevered margin of the solid surface countertop such that the edge treatment is firmly attached thereto.

Another further object of the present invention is to provide an edge treatment which can be mass produced, with each item having a uniform shape.

Another further object of the present invention is to provide a method of manufacturing edge treatments for solid surfacing which makes possible low cost edge treatments formed from solid surface material.

Another further object of the present invention is to provide an edge treatment for solid surfacing which exhibits a uniform exterior surface free from imperfections.

Another further object of the present invention is to provide an edge treatment for solid surfacing which is easily attachable to cantilevered margins of the solid surfacing in a manner providing a barely perceptible seam therebetween.

Another further object of the present invention is to provide an edge treatment for a cantilevered margin of solid surfacing which is stress relieved with no seam near a center of a reflex angle in the cantilevered margin, such that the edge treatment helps to prevent crack occurrence or propagations in angled cantilevered margins of the solid surface.

Viewed from a first vantage point it is an object of the present invention to provide a method for forming edge treatments for solid surfacing from blank stock, the edge treatments connectable to cantilevered margins of the solid surfacing at angles thereof where the margins are non-linear; including the steps of boring a cylindrical center hole through the stock to create an inner cylindrical surface; cutting an outer periphery of the stock to form an outer cylindrical surface substantially concentric with the inner cylindrical surface but having a greater diameter, such that the stock is formed into a torus; and dividing the torus into separate arcuate segments, each segment forming an edge treatment having a surface conforming to an angle of the cantilevered margin, whereby the edge treatments can be attached to angles of the cantilevered margin of the solid surfacing without a gap therebetween.

Viewed from a second vantage point it is an object of the present invention to provide a trim piece formed from solid surfacing for placement along a cantilevered margin of a countertop, the trim piece having two arcuate surfaces having associated radii of curvature, a connecting groove along one of the arcuate surfaces thereof for adhesion to a peripheral edge of the countertop.

Viewed from a third vantage point it is an object of the present invention to provide a kit for a countertop formed from a solid surface including an edge treatment along a cantilevered margin of the solid surface, the edge treatment connected to the solid surface providing a smooth transition therebetween, the kit including a countertop cantilevered margin projecting horizontally from a front edge of the countertop the cantilevered margin including a tongue extending horizontally therefrom, the cantilevered margin including angles such that the cantilevered margin exhibits a non-linear shape; and edge treatments connectable adjacent the tongue of the cantilevered margin, the edge treatments having one surface thereof including a groove therein complemental to the tongue of the cantilevered margin, whereby the edge treatments can be connected to said cantilevered margin.

These and other objects will be made manifest when considering the following detailed specification when taken in conjunction with the appended drawing figures.

BRIEF DESCRIPTION OF THE DRAWING FIGURES

DESCRIPTION OF PREFERRED EMBODIMENTS

Figure 7:
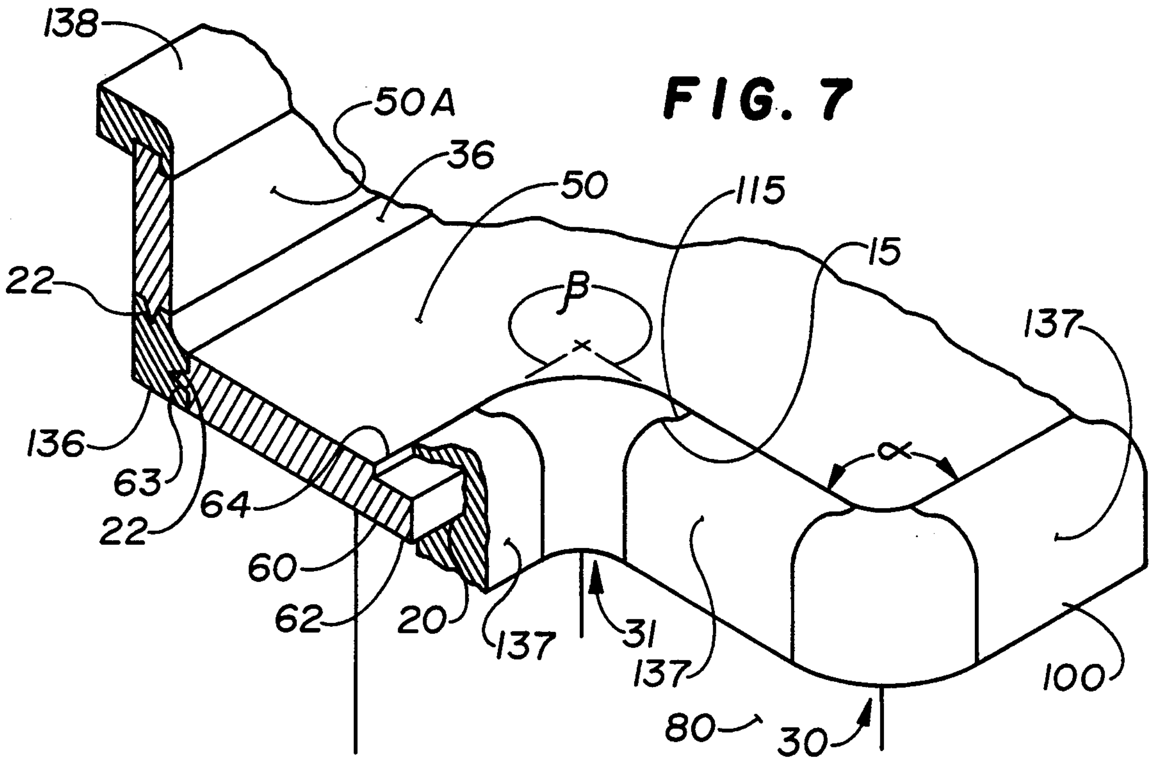
FIG. 7 is an isometric view of a countertop with solid surfacing including edge treatments connected to a cantilevered margin thereof and with a back splash portion connected adjacent thereto.

Referring to the drawings, wherein like reference numerals represent like parts throughout, reference numerals 30, 31 and 137 (FIG. 7) are directed to a corner edge treatment shaped from unfinished blank stock 1 (e.g. FIG. 1) and utilizable to cover a cantilevered margin 60 of solid surfacing 50 mounted upon case goods or cabinets 80 or some other fixture (FIG. 7).

Figure 5:
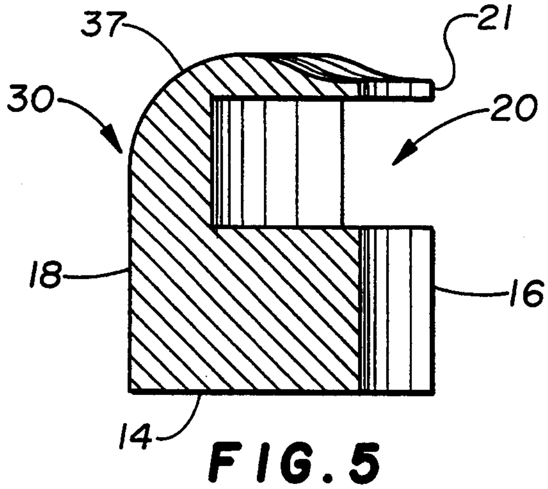
FIG. 5 is an alternative embodiment of that which is shown in FIG. 4 with a groove formed along one surface of the arcuate segment and a finished surface having a dripless contour formed on a top surface.
Figure 6:
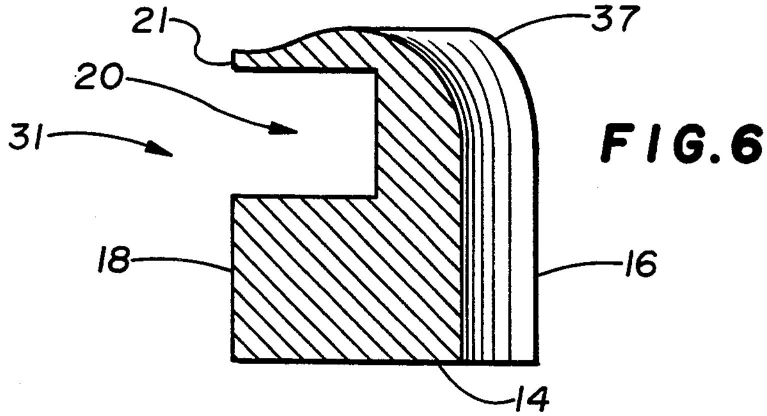
FIG. 6 is an alternative embodiment of that which is shown in FIG. 5 with the grooved surface and finished surface reversed.

In essence, the finished corner edge treatments 30, 31 shown in FIGS. 5 or 6 include an inner cylindrical surface 16 and an outer cylindrical surface 18 parallel to the inner cylindrical surface 16. Each edge treatment 30, 31 includes a groove 20 and a finished surface such as a "dripless" contour 37. When the groove 20 is carved into the inner cylindrical surface 16, the dripless contour 37 is carved into the top 12 nearest the outer cylindrical surface 18 (FIG. 5) this configuration of the edge treatment 31 facilitates use as an "outside" corner 30 (FIG. 7). Conversely, when the groove 20 is carved into the outer cylindrical surface 18 (FIG. 6) the dripless contour 37 is located on a top surface 12 nearest the inner cylindrical surface 16. This FIG. 6 edge treatment 31 facilitates use as an "inside" corner 31 (FIG. 7). FIGS. 9 through 13 show other contours besides the dripless contour 37 to provide different functions for the finishing of the cantilevered margins 60 of the solid surfacing 50.

The corner edge treatments 30, 31 are preferably formed from blank stock 1 (FIG. 1) by first boring a hole through the unfinished rectangular blank stock 1 along bore line "A" creating the inner cylindrical surface 16. The outer cylindrical surface 18 is then formed by carving away unfinished stock 1 along the outer surface line "B" thus creating the outer cylindrical surface 18. A torus 5 (FIG. 2) is thus created having a concentric inner cylindrical surface 16 and outer cylindrical surface 18. This torus 5 is then dividable along dividing lines "C" to create a plurality of corner edge treatments 10. Preferably the torus 5 is quartered. A groove 20 is formed into either the inner cylindrical surface 16 or the outer cylindrical surface 18. Preferably, the groove 20 is formed before the torus 5 is quartered.

Figure 8:
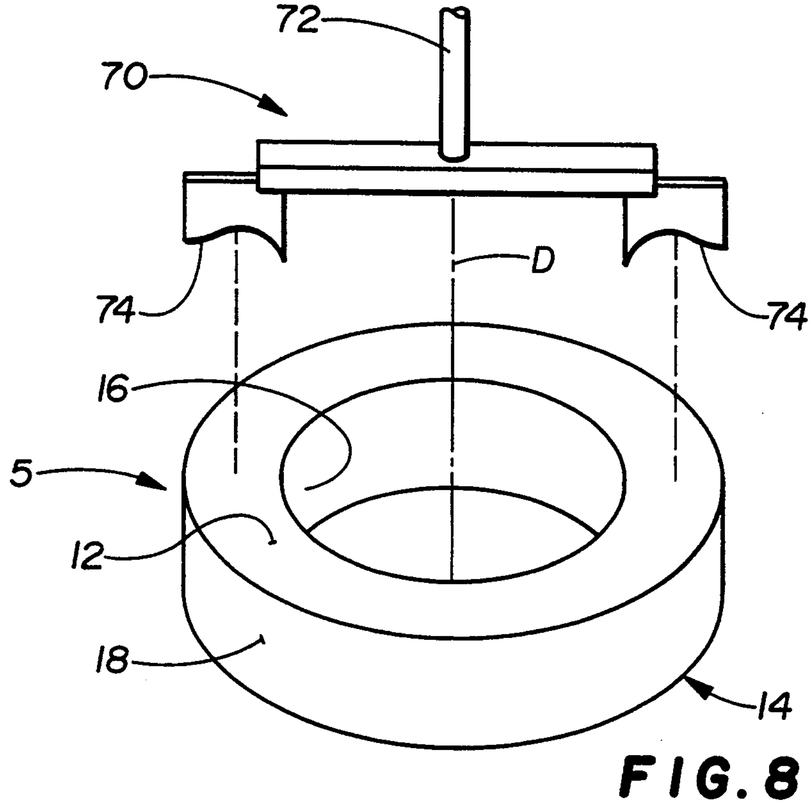
FIG. 8 is an isometric view of that which is shown in FIG. 2 also revealing details of a shaping bit utilizable in one embodiment of the invention to form the finished surface of the edge treatments.

A top 12 of the edge treatment 10 is finishable with a contour such as the dripless contour 37 to create outside dripless corners 30 and inside dripless corners 31. Preferably, top 12 is contoured before the step of dividing the torus 5 along dividing lines "C" using a contouring device such as a shaping bit 70 (FIG. 8). In this way, the torus 5 can be shaped such that, upon dividing the torus 5 along the dividing lines "C", all corner edge treatments 30, 31 have uniform contours.

Figure 1:
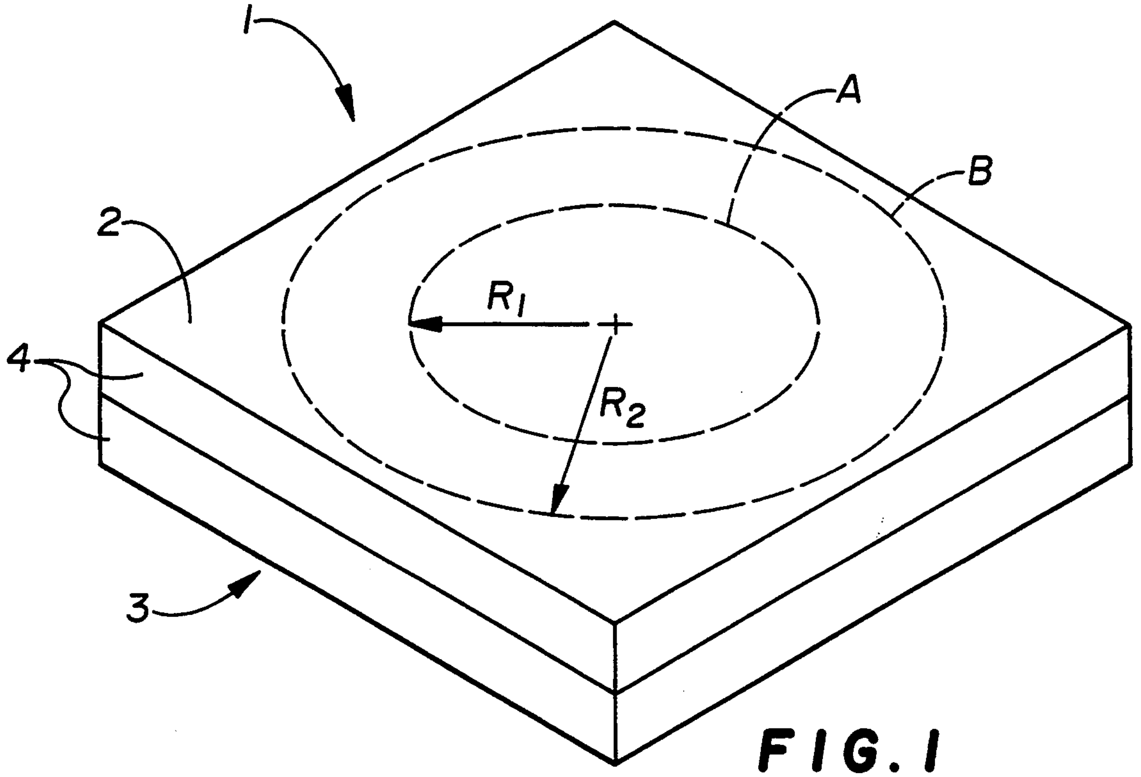
FIG. 1 is an isometric view of unfinished blank stock at the beginning of the edge treatment manufacturing process with cutting lines shown thereon.
Figure 2:
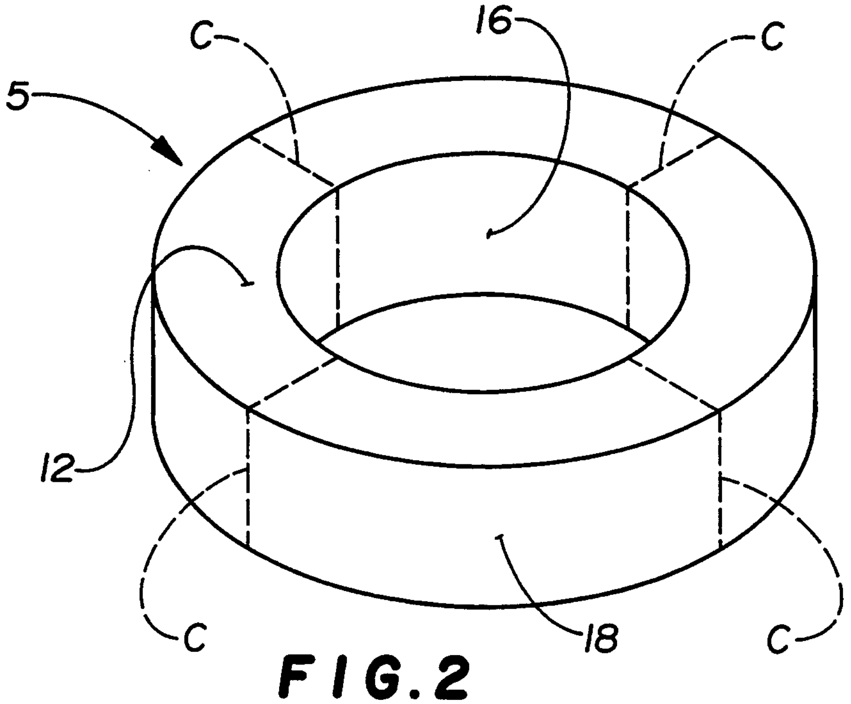
FIG. 2 is an isometric view of that which is shown in FIG. 1 after the first two cutting steps have been completed and revealing the lines upon which the next cutting steps may occur.

More specifically, and referring in detail to FIGS. 1 and 2, the corner edge treatments 30, 31 can be manufactured in the following manner. Initially, unfinished stock 1 is configured as a substantially rectangular blank made from solid surfacing material such as cast resin known as Corian TM. This can be identical material to the countertop 50 or the countertop may be of other materials depending on the requirements of the design. The unfinished stock 1 preferably has a top surface 2 and a bottom surface 3 which are oriented in parallel planes. Frequently the unfinished stock 1 is formed by laminating multiple layers 4 of the cast resin which is commercially available in sheet form. In this way, unfinished stock 1 having the requisite thickness is provided.

Next, a hole is bored perpendicularly through the unfinished stock 1 having a radius $R_1$ similar to a radius of the desired inner cylindrical surface 16. The hole bored through the unfinished stock 1 thus removes material circumscribed by the bore line "A".

Next, the unfinished stock 1 is carved along outer surface line "B" such that the radius $R_2$ of the outer cylindrical surface 18 is shaped concentric to the inner cylindrical surface 16. Once the unfinished stock 1 outside of the outer surface line "B" is removed, the unfinished stock 1 appears as a torus 5 (FIG. 2). The torus 5 can be formed by drilling, milling, lathe cutting, CNC machining or other techniques. Contouring rectangular stock is presently feasible because of the state of the art involving cast resin surfacing.

The torus 5 can now be divided by cutting along dividing lines "C", for instance to create the individual corner edge treatments, edge dressing or trim pieces 10. While four dividing lines "C" are shown in FIG. 2, this number is merely suggestive and could be modified to any amount desired. Before dividing the torus 5 along the dividing lines "C", the torus 5 may be further modified to provide each of the individual corner edge treatments 10 with a groove 20. Also, a finished contour such as a dripless contour 37 may be placed upon the top surface 12. Sequencing of the manufacturing steps in this manner ensures that each of the corner edge treatments 10 will be uniform.

Referring now in detail to FIG. 8, details of this torus 5 shaping are shown. FIG. 8 shows the contouring of the top 12 with a "dripless" contour 37 (FIG. 6) scribed by a cutting surface 74 having a complemental contour. Various other cutting surfaces (not shown) would provide the top 12 with various different contours. The topographical contour for the top 12 is thus variable but an important advantage this invention enjoys over the prior art. Once the proper cutting surface 74 is selected, the cutting surface 74 is attached to a shaping bit 70. The shaping bit 70 may be attached to a shaft 72 capable of rotation or may be mounted in a fixed manner with the torus 5 connected to a rotating attachment such as in a lathe. The utilization of a lathe or a drill press for the shaping of the top 12 is reflective of the instant invention's adaptability to various forming techniques.

Note that the cutting surface 74 may be oriented in either of two distinct positions depending on the desired orientation of the dripless contour 37 adjacent either the inner cylindrical surface 16 or the outer cylindrical surface 18 (see FIGS. 5 and 6). For example, if the corner edge treatment 30 were to be connected to a "right" angle $\alpha$ of the solid surfacing 50 (see FIG. 7) the cutting surface 74 should be oriented in a manner reversed 180° from that shown in FIG. 8. However, if the corner edge treatment 31 were to be connected to a "reflex" angle $\beta$ of the solid surfacing 50 (see FIG. 7) then the cutting surface 74 should be utilized as shown in FIG. 8. A berm medially disposed on the top surface 12 also is possible. Once the top 12 has been shaped utilizing the shaping bit 70, the torus 5 may also be grooved using a carving tool such as a dado or a router type device.

This operation could also be performed by a lathe or other machining device. Note that the groove 20 may be carved either on the inner cylindrical surface 16 (FIG. 5) or may be carved into the outer cylindrical surface 18 (see FIG. 6). On the torus 5 shown in FIG. 8 the groove 20 would be carved into the outer cylindrical surface 18. Once the torus 5 has been modified to include the groove 20 and the finished contour such as the dripless contour 37 shown in FIGS. 5 through 8, the torus 5 may then be divided by cutting along dividing line "C".

Figure 4:
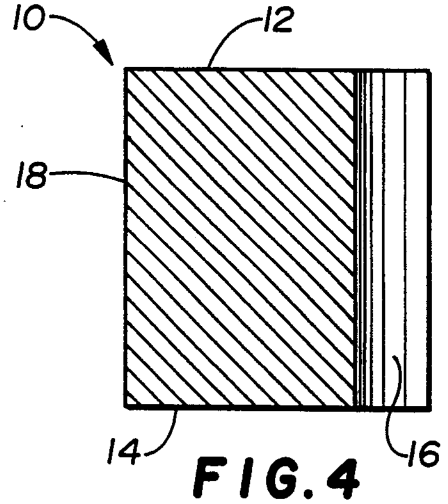
FIG. 4 is a cross-section taken along lines 4—4 of FIG. 3 revealing details of an arcuate segment of the torus without a groove or finished surface thereon.

If the torus 5 is divided along dividing line "C" before the groove 20 is carved and before the top surface 12 is contoured, the resulting corner edge treatments 10 may still be modified after using a machining tool such as a router. In either case, the corner edge treatment 10 or torus 5 has a cross-section similar to that revealed in FIG. 4 before the groove 20 is carved or the top surface 12 is contoured. The groove 20 may then be placed either on the inner cylindrical surface 16 as shown in FIG. 5 or on the outer cylindrical surface shown in FIG. 6. The dripless contour 37 is positioned such that the surface 16, 18 opposite the groove 20 transitions smoothly up to a lip 21 above the groove 20.

Figure 2A:
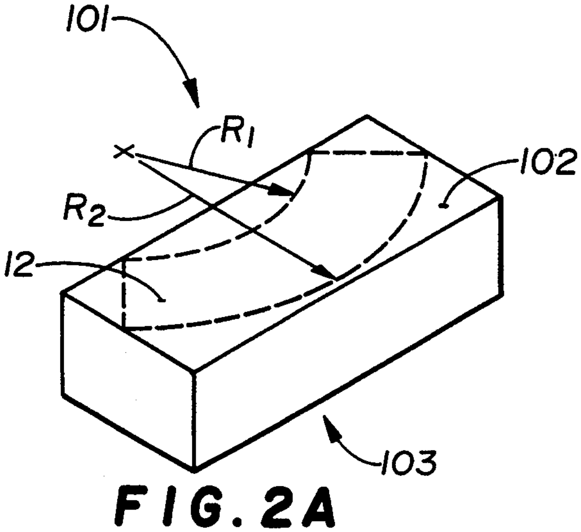
FIG. 2A shows an alternative technique of FIG. 2.

An alternative method for manufacturing the corner edge treatment 10 is shown in detail in FIG. 2A. Unfinished stock 101 is initially configured as a rectangular blank having a top surface 102 and a bottom surface 103 substantially parallel to each other. The unfinished stock 101 may be a blank having lesser surface area than the unfinished stock 1 of the preferred embodiment. This could save material. The unfinished stock 101 may be configured from separate lamination layers adhered in a manner similar to that described above with respect to the unfinished stock 1 of the preferred embodiment. While two specific methods of corner 30, 31 manufacture are specifically described above, other methods such as casting or extruding the edge treatments could also be done.

Figure 3:
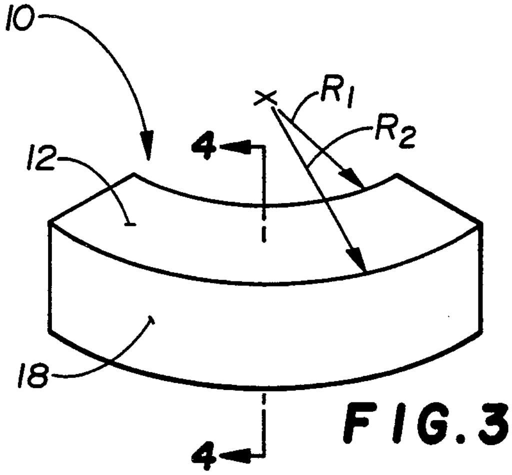
FIG. 3 is an isometric view of a portion of that which is shown in FIG. 2 after the cutting steps dividing the torus of claim 2 have been completed.

The corner edge treatment 10 is then shaped from the unfinished stock 101 by cutting the unfinished stock 101 along an inside radius of curvature $R_1$ which is similar to that of the inner cylindrical surface 16. The unfinished stock 101 is also cut along a line defined by an outside radius of curvature $R_2$ conforming to that of the outer cylindrical surface 18. Finally, the unfinished stock 101 is cut along two planes preferably perpendicular to the top surface 102 and the bottom surface 103 and intersecting both the inner cylindrical surface 16 and the outer cylindrical surface 18. Upon the completion of this process, the corner edge treatment 10 is provided with a contour similar to that shown in FIGS. 3 and 4 which resulted from the method of the preferred embodiment. The groove 20 and contour for the top 12 are then formed upon the corner edge treatment 10 in the manner described above.

Having these methods of manufacture, the corner edge treatment 10 is adapted into either an outside corner having a dripless contour 30 or an inside corner having a dripless contour 31. Note that if different contours besides the dripless contour 37 are utilized, the resulting corner edge treatment would differ slightly from the inside dripless corner 30 and the outside dripless corner 31. The corners 30, 31 are presented in a form capable of easy attachment to the solid surfacing 50.

Interlocking of the corners 30, 31 to complemental corners of the solid surfacing 50 is accomplished in the following manner. Initially, the solid surfacing 50 is provided having a cantilevered margin 60 which follows an outline desired for attachment to a top surface of the cabinet or other underlying structure 80. In this way, the solid surfacing 50 forms a countertop. The cantilevered margin 60 is then finished to include a tongue 62 extending from the cantilevered margin 60 in a plane parallel to the solid surfacing 50. The tongue 62 preferably has a thickness similar to the thickness of the solid surfacing 50 but with a step 64 on a top surface thereof. The step 64 preferably has a depth similar to a thickness of the lip 21 of the corners 30, 31. The groove 20 carved into the corners 30, 31 preferably has a thickness similar to a thickness of the tongue 62. Thus, the corners 30, 31 may be oriented with the groove 20 receiving the tongue 62 therein. The tongue 62 with included step 64 may be formed through the use of a machining device such as a router.

Corners 30, 31 should be selected to conform to angles (e.g. angles $\alpha$, $\beta$ of FIG. 7) in the cantilevered margin 60. For instance, at a right angle $\alpha$ in the cantilevered margin 60 of the solid surfacing 50, an outside corner 30 should be selected with the groove 20 formed in the inside cylindrical surface 16. Similarly, at a reflex angle $\beta$ in the cantilevered margin 60 of the solid surfacing 50, the groove 20 should be formed in the outer cylindrical surface 18 such that an inside corner 31 is provided. FIG. 7 shows solid surfacing 50 having a reflex angle $\beta$ subtending approximately 270° and a right angle $\alpha$ subtending approximately 90°. However, various angles having different measurements could be substituted for those shown in FIG. 7 with the corners 30, 31 adjusted by the location of the dividing line "C" (FIG. 2). The dividing lines "C" are merely adjusted to be separated by an angular distance similar to that subtended by the angles within the cantilevered margins 60 of the solid surfacing 50. Note that allowing the corner 31 to be seamless strengthens the solid surfacing 50 at a reflex angle $\beta$ where crack propagation often occurs.

Once angles in the cantilevered margin 60 of the solid surfacing 50 have been provided with either inside corners 31 or outside corners 30, straight edge treatments 100 may be cut of a length equal to a distance between separate corners 30, 31. The straight edge treatments 100 may be modified such as with a groove 20 and the dripless contour 37 to provide a dripless edge 137 (FIG. 7). Similarly, straight edge treatments 100 having different contours may be provided. The straight edge treatment 100 is inserted between the corners 30, 31 and adjacent the tongue 62 of the cantilevered margin 60. The corners 30, 31 and dripless edges 137 can then be sanded to remove any slight transitions existing between ends 15, 115 of the separate edge treatments.

Figure 9:
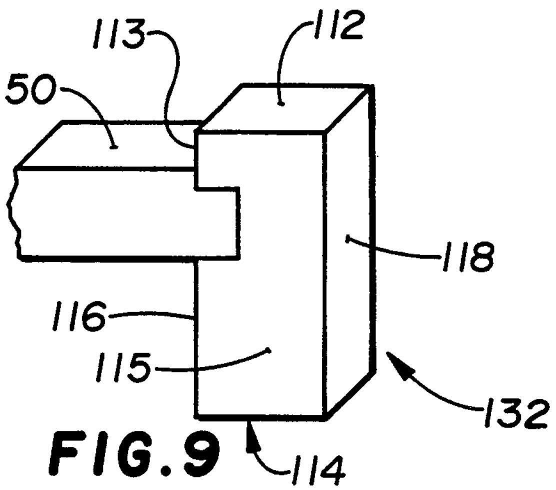
FIG. 9 is an isometric view of a junction between the cantilevered margin and an edge treatment revealing an embodiment where a groove is carved in one surface of the edge treatment but the remaining surfaces of the edge treatment are left as planar facets for later manipulation with a contouring tool such as a router.

FIGS. 9 through 13 show various different edge treatments utilizable as either straight edge treatment 100 (FIG. 7) or as corner edge treatments 30, 31 for angles $\alpha$, $\beta$ in the cantilevered margin 60. FIG. 9 shows an unfinished edge 132 which can be formed from a corner edge treatment 10 having only a groove 20 carved therein, but with an infinite radius of curvature. This unfinished edge 132 includes a top surface 112, a bottom surface 114, an inside planar surface 116, side surfaces 115, spill abutment 113 and an outside planar surface 118. Such a straight edge 132 could be formed from a variety of different methods. Arcuate edge treatments (not shown) could be provided having a contour similar to a cross-section of the straight edge 132.

Figure 10:
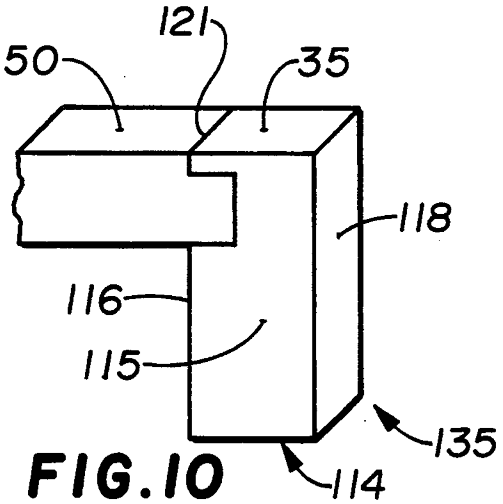
FIG. 10 is an alternative embodiment of that which is shown in FIG. 9 revealing a square edged edge treatment where a top surface of the edge treatment is coplanar with the countertop.

FIG. 10 reveals a square edge with a square contoured top surface 35 which is co-planar with the solid surfacing 50 so that the spill abutment 113 has been eliminated and only a lip 121 remains. Other features of the edge 135 are similar to these exhibited by the edge 132.

Figure 11:
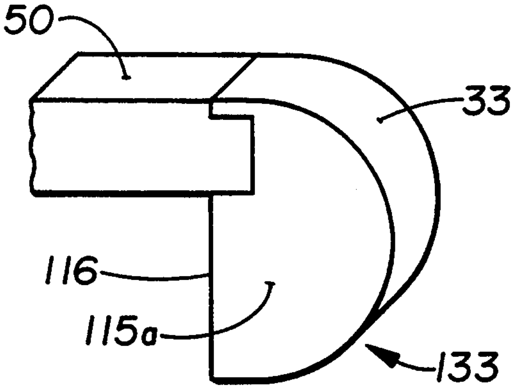
FIG. 11 is an isometric view of an alternative embodiment of that which is shown in FIG. 10 revealing a radiused finished surface edge treatment.

FIG. 11 reveals an edge treatment 133 having a radiused contour 33 which allows the finished top surface of the edge treatment to transition smoothly into a co-planar tangent relationship with the solid surfacing 50 before arcing downwardly. Note that shaping this radiused contour 33 in an arcuate edge treatment of similar cross-section could be performed by flipping the torus 5 over (FIG. 8) with the bottom surface 14 addressing the shaping bit 70. Sidewalls **115*a* are planar yet exhibit a peripheral contour modified by shaping of the contour 33**.

Figure 12:
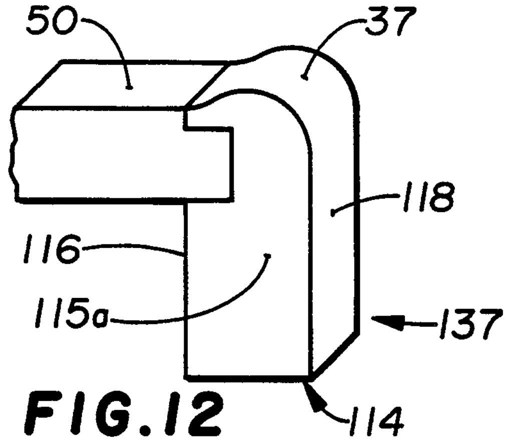
FIG. 12 is an isometric view of a portion of that which is shown in FIG. 7 revealing details of a dripless edge type edge treatment.

FIG. 12 reveals a dripless edge 137 similar to that shown in FIG. 7 with a dripless contour 37. This straight dripless edge 137 has a similar cross-section to the corners 30, 31. The bottom 114, inside surface 116 and outside surface 118 are similar to edge 132 of FIG. 9. However, the sidewalls **115*a* are modified to exhibit a peripheral contour reflecting the shape of the contour 37**.

Figure 13:
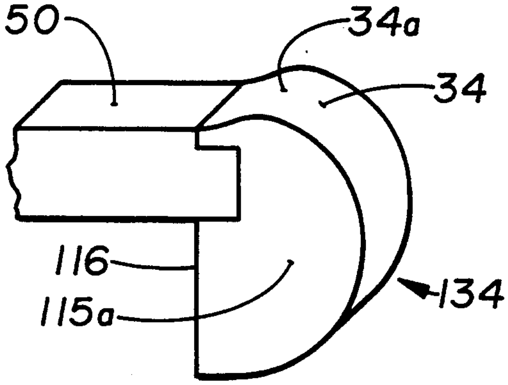
FIG. 13 is an isometric view of an alternative embodiment which combines the radiused edge of FIG. 11 with the dripless edge of FIG. 12.

FIG. 13 reveals a radiused dripless edge 134 including a radiused dripless contour 34 which combines features of that which is shown in FIGS. 11 and 12 by having a radiused contour 33 which transitions into a dripless contour 37 creating a hump **34*a* that defines the radiused dripless contour 34. The sidewalls 115*a* reflect the contour of the exposed edge on a side opposite solid surface 50. The sidewalls 115*a* preferably are identical in contour to ends 15** utilized in the same edge treatment, thus avoiding abrupt transitions.

Figure 14:
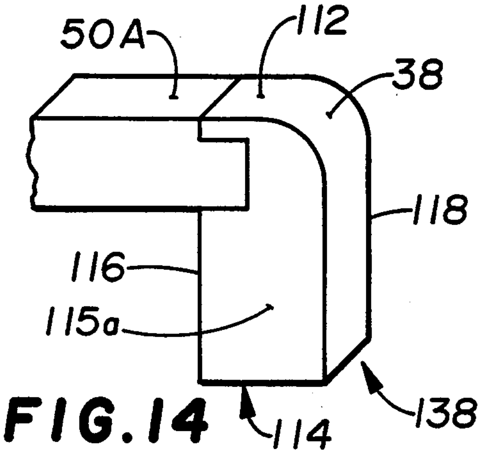
FIG. 14 is an isometric view of an alternative embodiment of that which is shown in FIG. 10 having only one radiused corner.

FIG. 14 reveals a fillet edge 138 having a fillet contour 38 at an edge between the top surface 112 and the outside surface 118. This edge 138 is also shown in FIG. 7 on an upper end of the backsplash 50A.

Other contours may also be utilized such as a cove contour 136 (FIG. 7). The cove piece 136 is particularly utilizable to join a section of solid surfacing 50 together with a backsplash 50A adjacent a wall or other vertical surface. The edges shown in FIG. 7 and 9 through 14 are only shown as linear edge treatment. However, the contours exhibited by these edges 132, 133, 134, 135, 136, 137, 138 are equally applicable in modifying the unfinished corner edge treatment 10 of FIG. 4. Thus, straight and angled portions of the cantilevered margin 60 can be covered in a fashion requiring little or no sanding.

In an alternative embodiment, the tongue 62 may be replaced with a pointed tongue 63 and the groove 20 may be replaced with a pointed groove 22 (FIG. 7). A pointed tongue 63 and pointed groove 22 of complemental shape are particularly utilizable in joining separate sections of solid surfacing 50 together such as with a cove edge 136.

The corners 30, 31 and edges 131, 132, 133, 134, 135, 136, 137 are preferably attached to the tongue 62 (or pointed tongue 63) with a joint adhesive interposed therebetween. In this way, the corners and edges are prevented from easily sliding off of the solid surfacing 50. Moreover, the groove 20 and tongue 62 could be transposed. The joint adhesive is preferably combined with resin dust from the previously machined corners or edges. This provides the adhesive with a color similar to that of adjacent material, further camouflaging the joint.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for forming edge treatments from unfinished stock for solid surfacing, the edge treatments connectable to cantilevered margins of the solid surfacing at corners; including the steps of:

boring a cylindrical center hole through the stock to create an inner cylindrical surface;

cutting an outer periphery of the stock to form an outer cylindrical surface substantially concentric with the inner cylindrical surface but having a greater diameter, such that the stock is formed into a torus; and dividing the torus into separate arcuate segments, each segment forming an edge treatment having a surface conforming to the corner of the cantilevered margin, whereby the edge treatments can be attached to the cantilevered margin of the solid surfacing.

2. The method of claim 1 including the further step of interlocking the edge treatment with a tongue and groove connection with the solid surface, the groove conforming to the tongue extending therebetween.

3. The method of claim 2 including the further steps of juxtaposing the edge treatment adjacent the cantilevered margin and with applying adhesive means therebetween.

4. The method of claim 3 including the further step of shaping sides of the edge treatment remote from the solid surface into a finished surface.

5. The method of claim 4 wherein said shaping step occurs before said dividing step and wherein said shaping step includes the steps of introducing a shaping bit adjacent the torus, the torus oriented concentric with an axis of rotation of the shaping bit, the shaping bit including a cutting surface extending radially outwardly from the rotational axis of the shaping bit a distance substantially equal to a radius of the torus, such that when said cutting surface comes into contact with the torus, while the torus rotates with respect to the shaping bit, the torus is shaped to conform to the outline of the cutting surface of the shaping bit;

whereby each of the arcuate segments within the torus forming edge treatments are provided with a identical surface opposite to the groove.

6. The method of claim 5 wherein said interlocking step takes the form of grooving the edge treatment and occurs before said dividing step such that each of the arcuate segments forming edge treatments within the torus are provided with a groove having a similar orientation with respect to other surfaces of each edge treatment.

7. The method of claim 6 wherein said boring step is preceded by the step of laminating a plurality of layers of planar solid surfacing having a finite thickness with adhesive means interposed between separate layers thereof, said laminating step providing the unfinished stock with sufficient thickness to allow the edge treatments to have dimensions greater than those obtainable from a single layer of said surfacing.

8. The method of claim 7 including dividing said torus into four segments, each segment comprised of approximately 90° of the original 360° torus.

9. The method of claim 8 including forming said groove on the outer cylindrical surface of the torus, and placing the edge treatments obtained from arcuate segments of the torus adjacent to reflex angles of the cantilevered margins of the solid surfacing.

10. The method of claim 8 including forming said groove on an inner cylindrical surface of said torus, and placing the edge treatments formed from arcuate segments of the torus adjacent to right angles of the cantilevered margins of the solid surfacing.

11. A trim piece formed from cast resin for placement along a cantilevered margin of a countertop, said trim piece having two arcuate surfaces having associated radii of curvature, a fastening means including a connecting groove recessed within one of said arcuate surfaces thereof for adhesion of said trim piece to a peripheral edge of the countertop.

12. The article of manufacture of claim 11 wherein a side of said trim piece not including said connecting groove is shaped to include a finished surface, such that when said connecting groove is connected to a cantilevered margin of said countertop said finished surface is exposed for decoration of the margin of said countertop.

13. The article of manufacture of claim 12 wherein said trim piece includes an arc of both an outer cylindrical surface and an inner cylindrical surface, said outer cylindrical surface located opposite said inner cylindrical surface, said outer cylindrical surface having a radius of curvature greater than a radius of curvature of said inner cylindrical surface.

14. The article of manufacture of claim 13 wherein said outer cylindrical surface includes said connecting groove therein and said inner cylindrical surface includes a portion of said finished surface thereon, such that said trim piece includes means to attach to an inside corner of the countertop.

15. The article of manufacture of claim 13 wherein said inner cylindrical surface includes said connecting groove thereon and said outer cylindrical surface includes a portion of said finished surface thereon.

16. The article of manufacture of claim 13 wherein said inner cylindrical surface and said outer cylindrical surface are formed by the method of boring a cylindrical center hole through the stock to create said inner cylindrical surface;

cutting an outer periphery of the stock to form said outer cylindrical surface substantially parallel to the inner cylindrical surface but having a greater diameter, such that the stock is formed into a torus; and dividing the torus into separate arcuate segments, each segment forming an edge treatment having a surface conforming to a corner of the cantilevered margin, whereby the edge treatments can be attached to the cantilevered margin of the solid surfacing.

17. The article of manufacture of claim 16 wherein ends of said trim piece between said inner cylindrical surface and said outer cylindrical surface have a shape similar to other second trim pieces having a linear configuration without a radius of curvature, such that said trim piece may be oriented adjacent the second trim piece with a smooth transition therebetween.

18. The article of manufacture of claim 13 wherein said trim piece is formed from the method of providing a blank of rectangular unfinished stock having upper and lower parallel finished surfaces, forming first and second arcuate edges which are parallel and yet have varying radii of curvature, and truncating two remaining unfinished surfaces of said unfinished stock along planes substantially perpendicular to the top and bottom surfaces of the unfinished stock.

19. A kit for edge dressing a solid surface formed from cast resin, the solid surface having a margin for receiving edge treatment connected to the solid surface providing a smooth transition therebetween, the kit including:

solid surfacing having a margin including a fastening means extending horizontally therefrom, said margin including non-linear portions such that the portions of the margin exhibits a curved shape; and edge treatments connectable with said fastening means of said margin, said edge treatments having one surface thereof including a complemental fastening means therein connectable to the fastening means of the margin, whereby the edge treatments can be connected to said margin.

20. The kit of claim 19 wherein said edge treatments include corner pieces having one surface with a radius of curvature conforming to a radius of curvature of non-linear portions of the margin, such that said edge treatments can conform to said margin where said margin is non-linear.

21. The kit of claim 20 wherein a surface opposite one said surface of said edge treatments having said radius of curvature forms part of a finished surface, the finished surface including a dripless edge contour, the dripless edge contour configured such that when said edge treatment is located with said fastening means of said margin, said dripless edge has an elevation higher than a top surface of said solid surfacing; such that liquids poured onto said solid surfacing are prevented from readily flowing over said edge treatments.

22. The article of manufacture of claim 11 wherein a side of said trim piece opposite said connecting groove includes a dripless edge contour, said dripless edge contour configured such that when said trim piece is located with said connecting groove coupled to a peripheral edge of the countertop, said dripless edge exhibits an elevation higher than a top surface of the countertop, such that liquids poured onto the countertop are prevented from readily flowing over the trim piece.

* * * * *